(12) United States Patent
Kondou

(10) Patent No.: US 10,411,577 B2
(45) Date of Patent: Sep. 10, 2019

(54) MAGNET ASSEMBLY FOR LINEAR MOTOR HAVING COVER MEMBER COVERING MAGNET PLATE

(71) Applicant: FANUC CORPORATION, Yamanashi (JP)

(72) Inventor: Yuusuke Kondou, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 15/713,957

(22) Filed: Sep. 25, 2017

(65) Prior Publication Data

US 2018/0097434 A1 Apr. 5, 2018

(30) Foreign Application Priority Data

Sep. 30, 2016 (JP) .................... 2016-194071

(51) Int. Cl.
| | | |
|---|---|---|
| *H02K 41/03* | (2006.01) | |
| *H02K 5/10* | (2006.01) | |
| *H02K 5/16* | (2006.01) | |
| *H02K 5/22* | (2006.01) | |
| *H02K 7/09* | (2006.01) | |

(52) U.S. Cl.
CPC ............ *H02K 41/031* (2013.01); *H02K 5/10* (2013.01); *H02K 5/16* (2013.01); *H02K 5/22* (2013.01); *H02K 7/09* (2013.01)

(58) Field of Classification Search
CPC .......... H02K 41/031; H02K 5/10; H02K 5/16; H02K 5/22; H02K 7/09
USPC ........ 310/12.02, 12.21, 12.27, 12.33, 25, 26
See application file for complete search history.

(56) References Cited

U.S. PATENT DOCUMENTS

| | | | | |
|---|---|---|---|---|
| 5,757,091 | A * | 5/1998 | Sogabe ............... | H02K 41/031 310/12.02 |
| 6,054,783 | A | 4/2000 | Philipp et al. | |
| 6,882,065 | B2 | 4/2005 | Morel et al. | |
| 7,057,312 | B2 * | 6/2006 | Hodzic ................ | H02K 41/03 310/12.01 |
| 2003/0137199 | A1 * | 7/2003 | Morel .................. | H02K 41/031 310/12.01 |

(Continued)

FOREIGN PATENT DOCUMENTS

| | | |
|---|---|---|
| JP | 2000501274 A | 2/2000 |
| JP | 2004507997 A | 3/2004 |

(Continued)

*Primary Examiner* — Julio C. Gonzalez
*Assistant Examiner* — Rashad H Johnson
(74) *Attorney, Agent, or Firm* — RatnerPrestia

(57) ABSTRACT

A magnet assembly for a linear motor includes a cover member having weak magnetic properties, which covers one or more magnet plates, and a fixing mechanism for positioning the end parts 14c of the cover member directly above permanent magnets and detachably fixing the cover member to the magnet plate. The cover member has a first surface part covering a surface of the magnet plate which faces an armature and second surface parts continuous from the first surface part and covering side parts of the magnet plate. Furthermore, the fixing mechanism is provided on the second surface parts. Through the use of this magnet assembly for a linear motor, it is possible to minimize a rise of the cover member from the magnet plate without deteriorating workability at the time of installation or replacement of the cover member.

7 Claims, 4 Drawing Sheets

(56) References Cited

U.S. PATENT DOCUMENTS

| | | |
|---|---|---|
| 2006/0125327 A1 | 6/2006 | Sogabe et al. |
| 2011/0291496 A1* | 12/2011 | Bobelis .................... H02K 5/10 |
| | | 310/12.23 |
| 2013/0049490 A1* | 2/2013 | Shimura .............. H02K 41/031 |
| | | 310/12.24 |
| 2015/0364965 A1 | 12/2015 | Fernandes Goncalves et al. |

FOREIGN PATENT DOCUMENTS

| | | |
|---|---|---|
| JP | 2006174583 A | 6/2006 |
| JP | 4667602 B | 4/2011 |

\* cited by examiner

MAGNET ASSEMBLY FOR LINEAR MOTOR HAVING COVER MEMBER COVERING MAGNET PLATE

BACKGROUND OF THE INVENTION

1. Field of the Invention

The invention relates to a magnet assembly for a linear motor comprising a magnet plate as a component of the linear motor and a cover member covering the magnet plate.

2. Description of the Related Art

Conventional linear motors comprise a magnet plate formed by sequentially arranging a plurality of permanent magnets in a single direction on an iron plate, and an armature as a movable body that is arranged opposite the upper surface of the magnet plate and which can move in the aforementioned single direction. Conventionally, in such a magnet plate for a linear motor, in order to protect the surface part of the magnet plate from foreign matter, such as swarf, etc., the magnet plate is covered with a protective cover made from a thin metal plate. In such a case, unless the protective cover is fully fixed in close contact with the magnet plate, foreign matter can intrude between the protective cover and the magnet plate. As a result, the protective cover rises and can come into contact with the armature opposing the magnet plate, and at least one of the armature, the protective cover, and the magnet plate may be damaged.

As a method of securing a protective cover in close contact with a magnet plate, there is a method for affixing the protective cover to the surface part of the magnet plate using an adhesive or the like. However, in this method, it is difficult to replace the protective cover after the protective cover is adhesively fixed.

Further, there is a method for affixing a protective cover to a magnet plate using screws. In order to prevent the protective cover from rising from the magnet plate, it is preferable to affix the area as close as possible to the central part of the protective cover with screws. However, it is impossible to provide threaded holes in the portion of the magnet plate corresponding to the area close to the central part of the protective cover, due to the presence of the permanent magnets. Further, in a linear motor, it is difficult to provide sufficient space for attaching screws between the opposing faces of the magnet plate and the armature.

As a method of overcoming such problems, a method of applying a magnetizable material to a protective cover of a magnet plate for a linear motor is proposed in Japanese Patent No. 4667602 (hereinafter referred to as "Patent Document 1"). In this method, the protective cover is attracted to the magnet plate only by the magnetic attraction force of the permanent magnets without the use of an adhesive, screws, or the like, and the aforementioned rising of the protective cover is suppressed.

In the method described in Patent Document 1, since the protective cover is fixed to the magnet plate only through the magnetic attraction force of the permanent magnets, it is necessary to strengthen the magnetism of the member used for the protective cover in order to more reliably prevent the protective cover from rising.

However, the stronger the magnetism of the member used for the protective cover, the worse the workability during installation and replacement of the protective cover.

Moreover, when producing a linear motor, a plurality of magnet plates are arranged to face the armature, as the moving body of the linear motor, and are arranged in a line with the permanent magnet arrangement direction of all the magnet plates being the same. In the aforementioned Patent Document 1, it is suggested that one protective cover covers a magnet assembly for a linear motor comprising a plurality of magnet plates arranged in a line. However, Patent Document 1 does not disclose a protective cover which covers from the face of the magnet plate opposite the armature to the side part. Thus, in the case of the magnet assembly for a linear motor disclosed in Patent Document 1, both edge portions of the joint between two adjacent magnet plates are exposed. Thus, foreign matter can accumulate in this portion, and the accumulated foreign matter may damage the armature, as the moving body.

Furthermore, in the case of manufacturing a magnet assembly for a linear motor having a length exceeding, for example, 10 meters, it is difficult to cover the entire magnet assembly with one protective cover. Thus, the protective cover used must be divided into multiple cover members. In this case, there is a joint between the ends of adjacent cover members. At such a time, if the cover members are not closely fixed to the magnet plate at the ends of the cover where the joint exists, there is a possibility that foreign matter may enter from that joint between the cover member and the magnet plate. As a result, there is the problem that the cover member may rise and come into contact with the armature, which may cause damage to the armature, protective cover, magnet plate, etc.

SUMMARY OF THE INVENTION

The invention provides a magnet assembly for a linear motor which can prevent foreign matter from entering between the cover member and the magnet plate while minimizing a rise of the cover member, without a reduction in workability during installation or replacement of the cover member.

According to a first embodiment of the present disclosure, a magnet assembly for a linear motor comprises a plurality of magnet plates formed by sequentially arranging a plurality of permanent magnets on a substrate in a direction, the magnet plates being disposed opposite to an armature as a moving body of the linear motor so as to align in the direction; a cover member of weak magnetic configured to cover one or more of the magnet plates; and a fixing mechanism configured to position an end part of the cover member just above the permanent magnets, and detachably fix the cover member to the magnet plates. The cover member includes a first surface part configured to cover surfaces of the magnet plates facing the moving body, and a second surface part extending from the first surface part, and configured to cover side parts of the magnet plates. The fixing mechanism is provided on the second surface part.

The present disclosure can also provide alternative embodiments, as listed below.

A second embodiment of the present disclosure provides the magnet assembly for a linear motor of the aforementioned first embodiment, wherein the cover member may be fixed to the magnet plate by the fixing mechanism so that the edge of the cover member in the direction is positioned at a center position of the permanent magnet.

A third embodiment of the present disclosure provides the magnet assembly for a linear motor of the aforementioned first embodiment or second embodiment, wherein the permanent magnets are sequentially arranged on the substrate of each of the magnet plates in the direction at a predetermined pitch, wherein the magnet plates are arranged in the direction so that the predetermined pitch of the permanent magnets is constant across the plurality of magnet plates, and wherein the first surface part of the cover member has a length that is an integral multiple of the predetermined pitch with respect to the direction of arrangement of the magnet plates.

A fourth embodiment of the present disclosure provides the magnet assembly for a linear motor of any one of the first embodiment to the third embodiment, wherein the cover member is disposed across two adjacent magnet plates so as to cover a joint between the two magnet plates.

A fifth embodiment of the present disclosure provides the magnet assembly for a linear motor of any one of the first embodiment to the fourth embodiment, wherein the cover member includes a plurality of the cover members.

A sixth embodiment of the present disclosure provides the magnet assembly for a linear motor of any one of the first embodiment to the fifth embodiment, wherein the cover member, which covers an endmost magnet plate of the magnet assembly, includes a third surface part extending from the first surface part, and configured to cover an exposed end face part of the endmost magnet plate.

A seventh embodiment of the present disclosure provides the magnet assembly for a linear motor of any one of the first embodiment to the sixth embodiment, wherein the fixing mechanism includes a screw, a threaded hole formed at the side part of the magnet plate, and a hole formed at the second surface part, and into which the screw is inserted.

BRIEF DESCRIPTION OF THE DRAWINGS

The above-mentioned or other objects, features and advantages of the invention will be clarified from the detailed description of embodiments of the present disclosure, with reference to the accompanying drawings, in which:

FIG. 6 is a longitudinal sectional view illustrating another embodiment of the magnet plate and cover member constituting the magnet assembly for a linear motor shown in FIG. 1 and FIG. 2 and the like.

DETAILED DESCRIPTION

Figure 1:
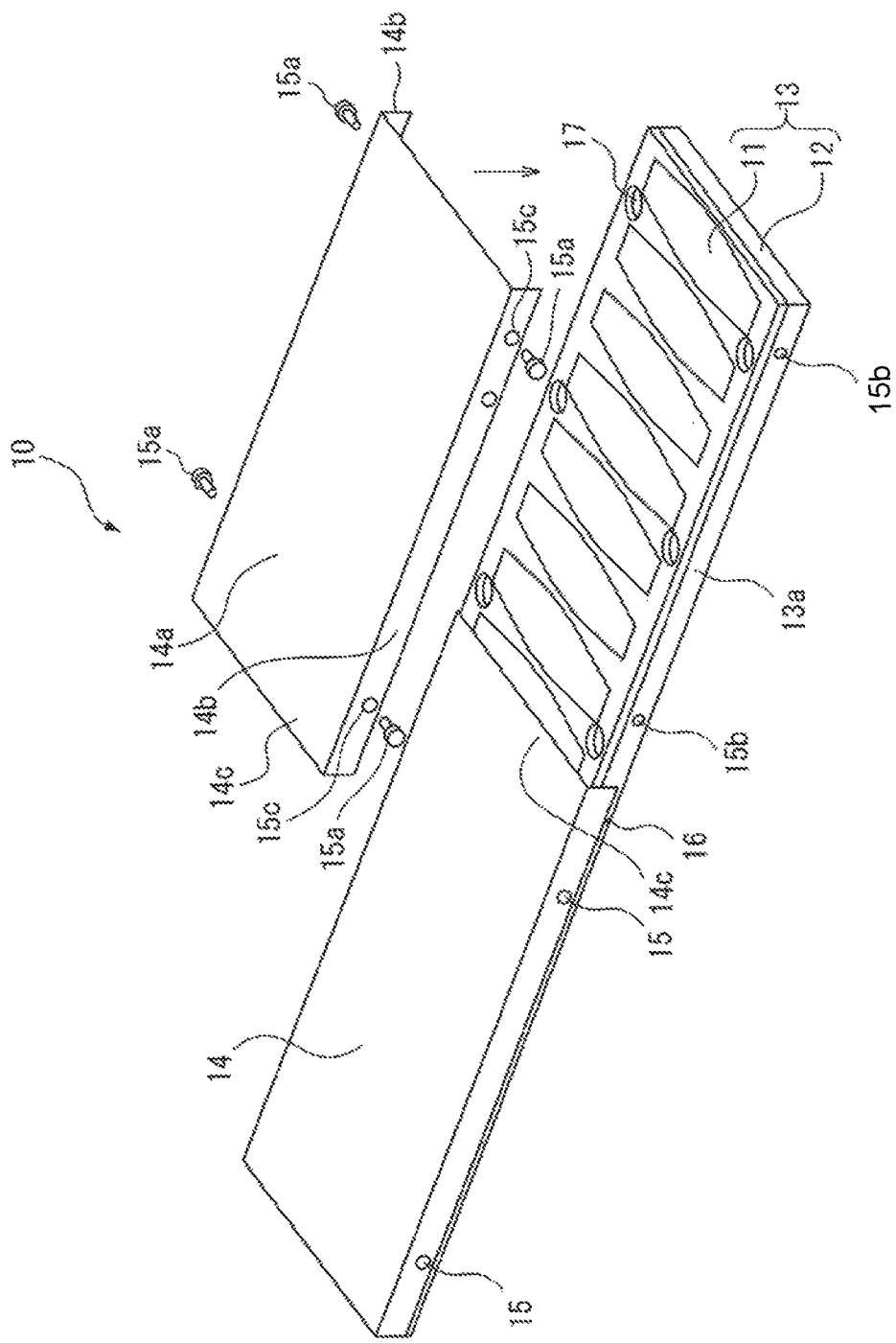
FIG. 1 is a perspective view of a magnet assembly for a linear motor in an embodiment, illustrating an embodiment of the magnet assembly in which a portion of the cover members are not mounted.

The embodiments of the present disclosure will now be described with reference to the drawings. In the referenced drawings, the same members or the same functional components are given the same reference numerals. For ease of understanding, the drawings are modified in scale as appropriate. Furthermore, the embodiments illustrated in the drawings are merely examples of implementation of the invention, and the invention is not limited to the illustrated embodiments.

FIG. 1 is a perspective view of a magnet assembly 10 for a linear motor according to an embodiment, wherein a portion of cover members 14 of the magnet assembly 10 are not mounted.

As illustrated in FIG. 1, the magnet assembly 10 for a linear motor (hereinafter referred to as a magnet assembly) includes a plurality of magnet plates 13 formed by sequentially arranging a plurality of permanent magnets 11 on a substrate 12 in a direction. Further, a surface (the upper surface in FIG. 1) of the magnet plate 13 opposite the substrate 12 is made flat with using a resin or the like.

The magnet assembly 10 is constructed by arranging a plurality of magnet plates 13 so as to be opposite to an armature (not shown) as a moving body of a linear motor and align in the above-mentioned direction. Note that, although only two magnet plates 13 are shown in FIG. 1, the number of magnet plates 13 is not limited thereto. The number of magnet plates 13 can be freely determined depending on the distance by which the armature is moved.

Furthermore, as shown in FIG. 1, the magnet assembly 10 includes a plurality of cover members 14 of weak magnetic configured to cover one or more magnet plates 13, and fixing mechanisms 15 configured to detachably fix the cover members 14 to the one or more magnet plates 13.

The cover member 14 includes a first surface part 14a which covers the surface of the magnet plate 13 facing the armature (not shown), and second surface parts 14b extending from the first surface part 14a, and cover the side parts 13a of the magnet plate 13, respectively.

The fixing mechanism 15 is provided so that end parts 14c 14c of the cover member 14 are positioned just above the permanent magnets 11.

An example of the fixing mechanism 15 includes a screw 15a, a threaded hole 15b formed at the side part 13a of the magnet plate 13, and a hole 15c formed at the second surface part 14b of the cover member 14 and into which the screw 15a is inserted. The hole 15c is not limited to a round hole, but may be a notch.

Of course, the fixing mechanism 15 is not limited to a fixing mechanism using screws, if the cover member 14 can be easily and accurately positioned.

Due to the aforementioned configuration, the end parts 14c and the first surface part 14a of the cover member 14 of weak magnetic are brought into close contact with the surface of the magnet plate 13 on the side facing the moving body, by the magnetic attraction force of the permanent magnets 11 and by the positioning of the cover member 14 by the fixing mechanism 15. In this regard, the "end part of the cover member" mentioned here means not only the just edge in the longitudinal direction of the cover member 14, but also an area of certain width from the edge.

In order to facilitate the replacement and positional adjustment of the cover member 14, the cover member 14 is made from a member of weak magnetic so that the cover member 14 can be easily detached from the magnet plate 13 against the magnetic attractive force of the permanent magnets 13. It is preferable that the magnetic material, of which the cover member 14 is made, has a layer thickness of 0.1 mm or more and 1.0 mm or less, and a saturation magnetic induction of e.g. 0.3 tesla or more and 1.5 tesla or less. Stainless steel may be one example of such material of weak magnetic. Of course, the material of the cover member of the invention may be any member of weak magnetic, and is not limited to stainless steel.

In the present embodiment described above, the surface of the magnet plate 13 facing the armature can be covered by the first surface part 14a of the cover member 14, and the side parts 13a of the magnet plate 13 can be covered by the second surface parts 14b of the cover member 14. As a result, the surface of the magnet plate 13 facing the armature is not exposed to the outside. Thus, it is possible to prevent the accumulation of dust or dirt on the surface of the magnet plate 13 facing the armature.

Furthermore, by forming such cover member 14 from a member of weak magnetic, it is possible to facilitate the replacement and positional adjustment of the cover member 14. However, if the magnetic properties of the cover member 14 of weak magnetic are too weak, the cover member and the magnet plate 14 may not reliably come into close contact with each other, thereby, a gap may be formed between the cover member 14 and the magnet plate 13. Accordingly, it is desirable to not only fix the cover member 14 to the magnet plate 13 by the magnetic attraction force of the permanent magnets 11, but also to reliably bring the cover member 14 into close contact with the magnet plate 13, by additionally using the fastening of screws or the like. In this respect, the second surface parts 14b of the cover member 14 are fixed to the side parts 13a of the magnet plate 13 by the fixing mechanism 15. Due to this, even when there is no sufficient space between the magnet plate 13 and the armature facing the magnet plate 13, the cover member 14 can be fixed in close contact with the magnet plate 13 by the fixing mechanism 15.

By making use of the magnetic attraction force of the permanent magnets 11 and the mechanical fixing force of the fixing mechanism 15 in order to tightly contact the cover member 14 with the magnet plate 13, it is possible to bring the cover member 14 into close contact with the magnet plate 13 without setting the magnetism of the cover member 14 to be excessively strong. Therefore, it is possible to prevent the work efficiency for the attachment or replacement of the cover member 14 from being reduced.

In particular, if the end parts 14c of the cover member 14 are not in sufficiently close contact with the magnet plate 13, foreign matter such as dust or dirt can enter the gap between the cover member 14 and the magnet plate 13 from the end parts 14c, as a result of which the cover member 14 may be spaced away therefrom. In order to address this, in the present embodiment, the fixing mechanism 15 is provided so that the end parts 14c of the cover member 14 having weak magnetic properties are positioned just above the permanent magnets 11, thereby the effect that the end parts 14c of the cover member 14 is spaced away from the magnet plate 13 can be minimized.

The magnet assembly 10 of the present embodiment will be described in greater detail.

Figure 2:
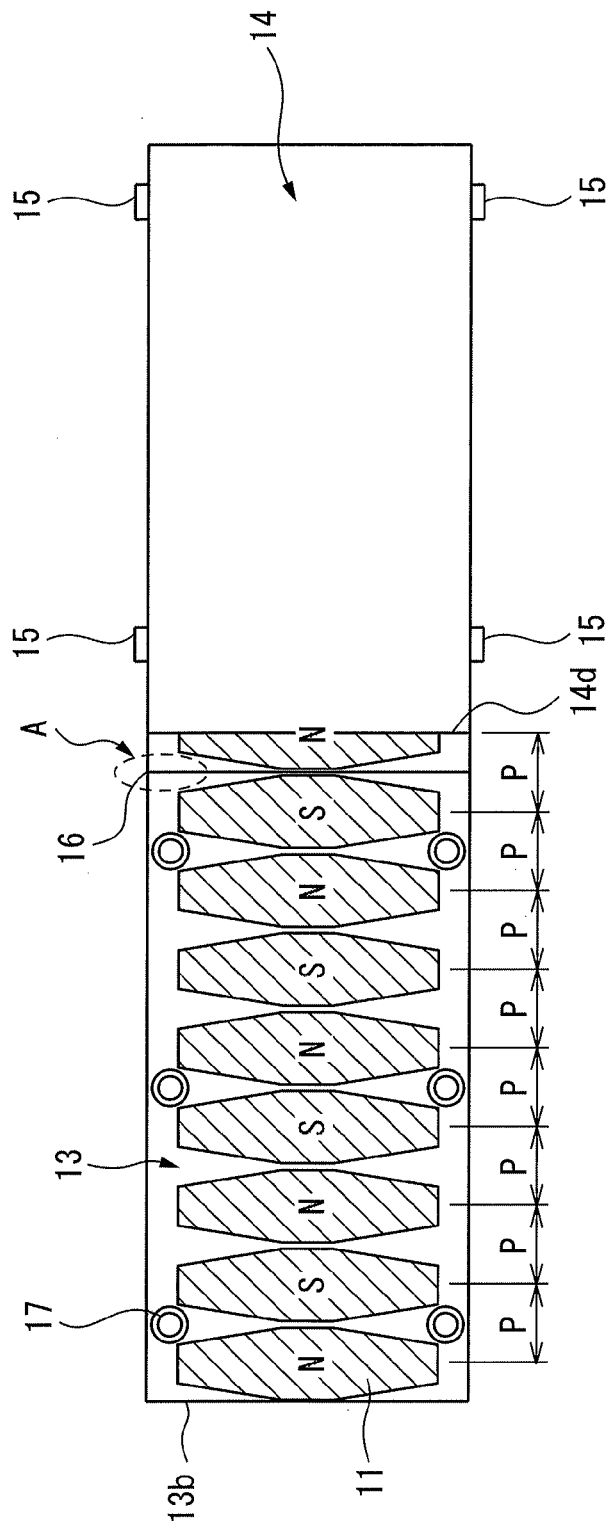
FIG. 2 is a top view of the surface of the magnet assembly for a linear motor facing the moving body in an embodiment, illustrating an embodiment of the magnet assembly in which a portion of the cover members are not mounted.

FIG. 2 is a top view showing the surface of the magnet assembly 10 on the side facing the moving body (not shown), wherein a part of the cover members 14 is omitted from the magnet assembly 10. Further, FIG. 3 is a side view of the magnet plate 13 shown in FIG. 2, which shows the fixation points of the cover member 14 with respect to the magnet plate 13.

Figure 3:
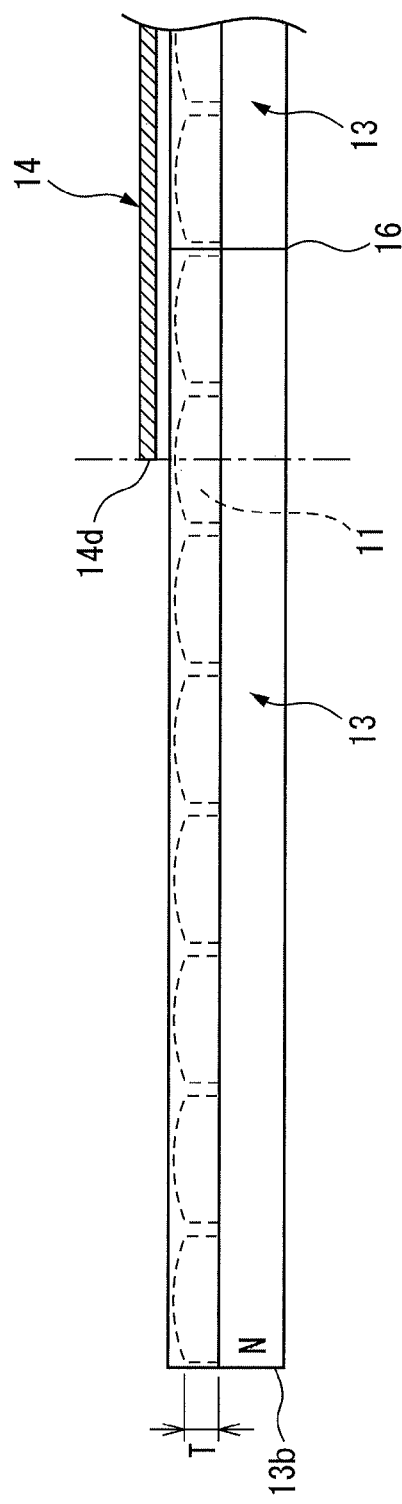
FIG. 3 is a side view of the magnet plate shown in FIG. 2, illustrating the points at which the cover member is fixed to the magnet plate.

In the present embodiment, it is preferable that the cover member 14 is fixed to the magnet plate 13 by the fixing mechanism so that the edge 14d of the cover member 14 in the longitudinal direction (i.e., the arrangement direction of the permanent magnets 11) is positioned at the center position of the permanent magnet 11, as shown in FIG. 2 and FIG. 3.

More specifically, a plurality of permanent magnets 11 are sequentially arranged on the substrate 12 of each magnet plate 13 at a predetermined pitch P. When manufacturing the magnet assembly 10, two or more magnet plates 13 are arranged in a row, along with the permanent magnets 11 being arranged in the same direction in all of the magnet plates 13. At this time, each magnet plate 13 is arranged so that the predetermined pitch P of the permanent magnets remains constant across the arranged two or more magnet plates 13. Further, in order to install each magnet plate 13, countersink holes 17, into which screws are inserted, are provided at the upper surface of the magnet plate 13.

In this configuration, there is no permanent magnet 11 in the vicinity of the joint 16 between adjacent magnet plates 13 (i.e., the region indicated by the dotted line indicated by arrow A in FIG. 2). Due to this, the magnetic attraction force is weak in the vicinity of the joint 16. Further, the magnetic attraction force in the region between the adjacent permanent magnets 11 in each magnet plate 13 is weaker than in the regions just above the permanent magnets 11.

Furthermore, in order to reduce the cogging force generated when the armature of the linear motor is moved, regarding the shape of each of the permanent magnets 11, the thickness T of each permanent magnet 11 may be gradually reduced from the central portion (center position) of the permanent magnet 11 towards both sides of the permanent magnet, as shown in FIG. 3. In this case, since the distance between the permanent magnet 11 and the first surface part 14a of the cover member 14 is largest in the vicinity of the joint 16 and in the region between adjacent permanent magnets 11, the magnetic attraction force applied to the cover member 14 is smaller in these regions.

From the reason described above, if the edge 14d of the cover member 14 in the longitudinal direction is disposed to be opposite to the vicinity of the joint 16 or the region between adjacent permanent magnets 11, the edge 14d of the cover member 14 is easily spaced away therefrom.

Figure 4:
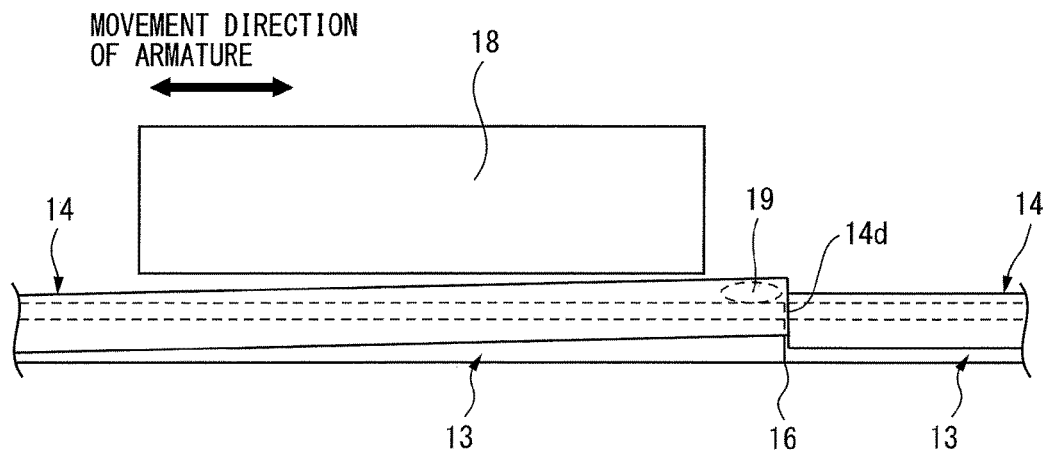
FIG. 4 is a diagram schematically illustrating an occurrence of the problem of foreign matter entering between the cover member and the magnet plate.

As already explained, if the cover member 14 is not in close contact with the magnet plate 13 at their edges 14d, foreign matter such as dust or dirt may enter between the cover member 14 and the magnet plate 13, which causes a problem that the cover member is spaced away from the magnet plate 13. FIG. 4 is a diagram schematically showing a situation in which such a problem occurs.

As shown in FIG. 4, the cover member 14 is separated from the magnet plate 13 due to foreign matter 19 entering a space between the cover member 14 and the magnet plate 13 from the edge 14d of the cover member 14, thereby the cover member 14 may contact the armature 18 moving along the upper surface of the magnet plate 13. As a result, the armature 18, the cover member 14, and the magnet plate 13, etc., may be damaged.

However, in the present embodiment, the edge 14d of the cover member 14 is positioned at the center position of the permanent magnet 11 when the cover member 14 is fixed to the magnet plate 13 by the fixing mechanism 15, as shown in FIG. 2 and FIG. 3. The center position of the permanent magnet 11 is a location where the amount of the magnet is largest, and the distance between the cover member 14 and the magnet is smallest. That is, the center position of the permanent magnet 11 is a location where the magnetic attraction force with respect to the cover member 14 is strongest. As a result, it is possible to minimize the effect that the edge 14d of the cover member 14 is spaced away from the magnet plate 13, thereby, the damage to the armature 18 and the cover member 14 as described above can be prevented.

Moreover, in the state where one cover member 14 is fixed to the magnet plate 13 so that the edge 14d thereof is positioned at the center of the given permanent magnet 11 on the magnet plate 13 as shown in FIG. 2, another cover member 14 (not shown in FIG. 2) is further fixed to the given magnet plate 13. In this case, the other cover member 14 is fixed to the magnet plate 13 so that the edge 14d thereof is positioned at the center of the given permanent magnet 11 as well. At this time, the edges 14d of the two cover members 14 are in contact with each other at the center position of the aforementioned given permanent magnet 11, and do not exist in the position of the joint 16 between adjacent magnet plates 13.

In other words, the other cover member 14 is disposed across two adjacent magnet plates 13 so as to cover the joint 16. Thus, in the present embodiment, there is no possibility that foreign matter 19 are deposited in the joint 16 between the magnet plates 13, unlike in the prior art.

Further, in the present embodiment, it is preferable that not only one edge 14d in the longitudinal direction of the cover member 14, but also the other edge 14d is positioned at the center of the permanent magnet 11 on the magnet plate 13, in order to minimize the rise thereof from the magnet plate 13. To this end, it is more preferable that the first surface part 14a of the cover member 14 has a length which is an integral multiple of the predetermined pitch P (the integer does not include zero) in the direction of the arrangement of the magnet plates 13.

Figure 5:
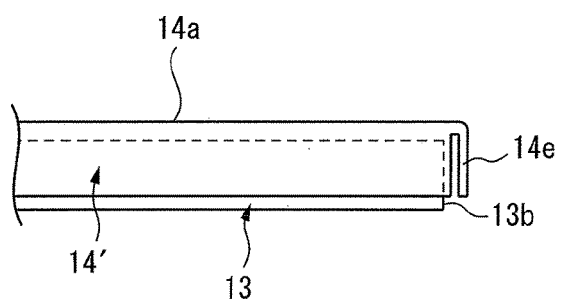
FIG. 5 is a side view illustrating the embodiment of the cover member mounted on the endmost magnet plate of the magnet assembly for a linear motor in an embodiment.

In this regard, if the edge 14d of the cover member 14 is merely aligned with the center position of the permanent magnet 11, a part of the upper surface of the endmost magnet plate 13 among the plurality of magnet plates 13 aligned in a row may be not covered by the cover member 14. FIG. 5 is a side view of a cover member 14' having a configuration which takes this problem into account, wherein the cover member 14' is attached to the endmost magnet plate 13 of the magnet assembly 10.

As shown in FIG. 5, the cover member 14' includes a third surface part 14e which extends from the first surface part 14a and which covers the exposed end face part 13b of the endmost magnet plate 13 of the magnet assembly 10. By using the cover member 14' having such third surface part 14e for the endmost magnet plate 13 of the magnet assembly 10, it is possible to more-effectively reduce the possibility that the cover member 14' is spaced away from the magnet plate 13 due to the foreign matter 19 entering between the cover member 14' and the magnet plate 13.

Next, another embodiment will be described.

Figure 6:
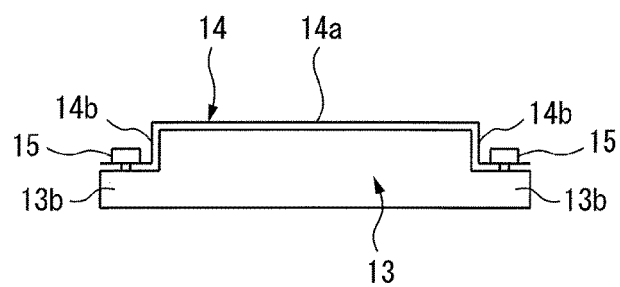

FIG. 6 is a longitudinal cross-sectional view showing another embodiment of the magnet plate 13 and the cover member 14 constituting the magnet assembly 10 for a linear motor shown in FIG. 1 and FIG. 2, etc.

The side parts 13a of the magnet plate 13 shown in FIG. 1 and FIG. 2 are formed to be planar portions which are substantially perpendicular to the surface of the magnet plate 13 facing the armature 18, wherein the second surface parts 14b of the cover member 14 covering these planar portions are integrally formed with the first surface parts 14a. However, in the present disclosure, the embodiment of the side parts 13a of the magnet plate 13 are not limited to such planar portions, buy any shape may be employed. Accordingly, the side parts 13a of the magnet plate 13 may have structures changing in a stepwise manner, as shown in FIG. 6. In this case, as shown in FIG. 6, the second surface parts 14b of the cover member 14 are preferably bent along the side parts 13a changing stepwisely, and fixed to the side parts 13a by the fixing mechanisms 15 such as screws.

Although the invention has been described above using representative embodiments, those skilled in the art will understand that modifications and various other alterations, omissions, and additions can be made to the components of the aforementioned embodiments without departing from the scope of the present disclosure.

Furthermore, appropriate combinations of some of the constituent elements described in the above embodiments are within the scope of the present disclosure.

Effect of the Present Disclosure

According to the above-described first embodiment, fifth embodiment and seventh embodiment of the present disclosure, a cover member can cover from the surface of the magnet place facing the armature to the side parts of the magnet plate, making it possible to prevent the accumulation of dust or dirt on the surface of the magnet plate facing the armature. By forming the cover member from a member of weak magnetic, it is easy to replace or adjust the position of the cover member. Since the fixing mechanism is provided on the second surfaces of the cover member covering the side parts of the magnet plate, even if there is not sufficient space between the magnet plate and the opposing armature, the cover member can be fixed in close contact with the magnet plate through the use of the fixing mechanism. In order to bring the cover member into close contact with the magnet plate, by combining the magnetic attraction force of the permanent magnets with the mechanical fixing force of the fixing mechanism, it is possible to bring the cover member into close contact with the magnet plate without excessively strengthening the magnetism of the cover member, thus preventing a deterioration in workability when installing or replacing the cover member.

In particular, the aforementioned fixing mechanism is provided such that the end part of the cover member having weak magnetic properties is positioned just above the permanent magnet. Thus, it is possible to prevent foreign matter from entering between the cover member and the magnet plate, minimizing a rise in the end part of the cover member.

According to the above-described second embodiment and third embodiment of the present disclosure, positioning the edge of the cover member at the center position of the permanent magnet, which is the position where the magnetic attractive force is strongest, can enhance the effect of suppressing the rise of the cover member.

According to the above-described fourth embodiment of the present disclosure, it is possible to prevent the accumulation of dust, dirt, etc., in the joint between adjacent magnet plates.

According to the above-described sixth embodiment of the present disclosure, regarding the endmost magnet plate of the magnet assembly, by covering the exposed end face part of the magnet plate with one part of the cover member, it is possible to prevent foreign matter from entering between the cover member and the magnet plate from the end face part of the endmost magnet plate. As a result, the effect of suppressing a rise of the cover member can be further enhanced.

The invention claimed is:
1. A magnet assembly for a linear motor, comprising:
   a plurality of magnet plates formed by sequentially arranging a plurality of permanent magnets on a substrate in a direction, the magnet plates being arranged opposite to an armature as a moving body of the linear motor so as to align in the direction;

a cover member of weak magnetic properties configured to cover one or more of the magnet plates; and a fixing mechanism configured to position an end part of the cover member above the permanent magnet in a first direction parallel to the substrate, and detachably fix the cover member to the magnet plates, wherein the cover member includes:
- a first surface part configured to cover a surface of the magnet plate facing the moving body; and
- a second surface part extending from the first surface part such that the second surface part is perpendicular to the first surface part, and configured to cover a side part of the magnet plate, wherein the fixing mechanism is provided on the second surface part.

2. The magnet assembly according to claim 1, wherein the cover member is fixed to the magnet plates by the fixing mechanism so that an edge of the cover member in the direction is positioned at a center position of the permanent magnet.

3. The magnet assembly according to claim 1, wherein the permanent magnets are sequentially arranged on the substrate of each of the magnet plates in the direction at a predetermined pitch, wherein the magnet plates are arranged in the direction so that the predetermined pitch of the permanent magnets is constant across the plurality of magnet plates, and wherein the first surface part of the cover member has a length that is an integral multiple of the predetermined pitch with respect to the direction of arrangement of the magnet plates.

4. The magnet assembly according to claim 1, wherein the cover member is disposed across two adjacent magnet plates so as to cover a joint between the two magnet plates.

5. The magnet assembly according to claim 1, wherein the cover member includes a plurality of the cover members.

6. The magnet assembly according to claim 1, wherein the cover member, which covers an endmost magnet plate of the magnet assembly, includes a third surface part extending from the first surface part, and configured to cover an exposed end fact part of the endmost magnet plate.

7. The magnet assembly according to claim 1, wherein the fixing mechanism includes:
- a screw;
- a threaded hole formed at the side part of the magnet plate; and
- a hole formed at the second surface part, and into which the screw is inserted.

* * * * *